UNITED STATES PATENT OFFICE.

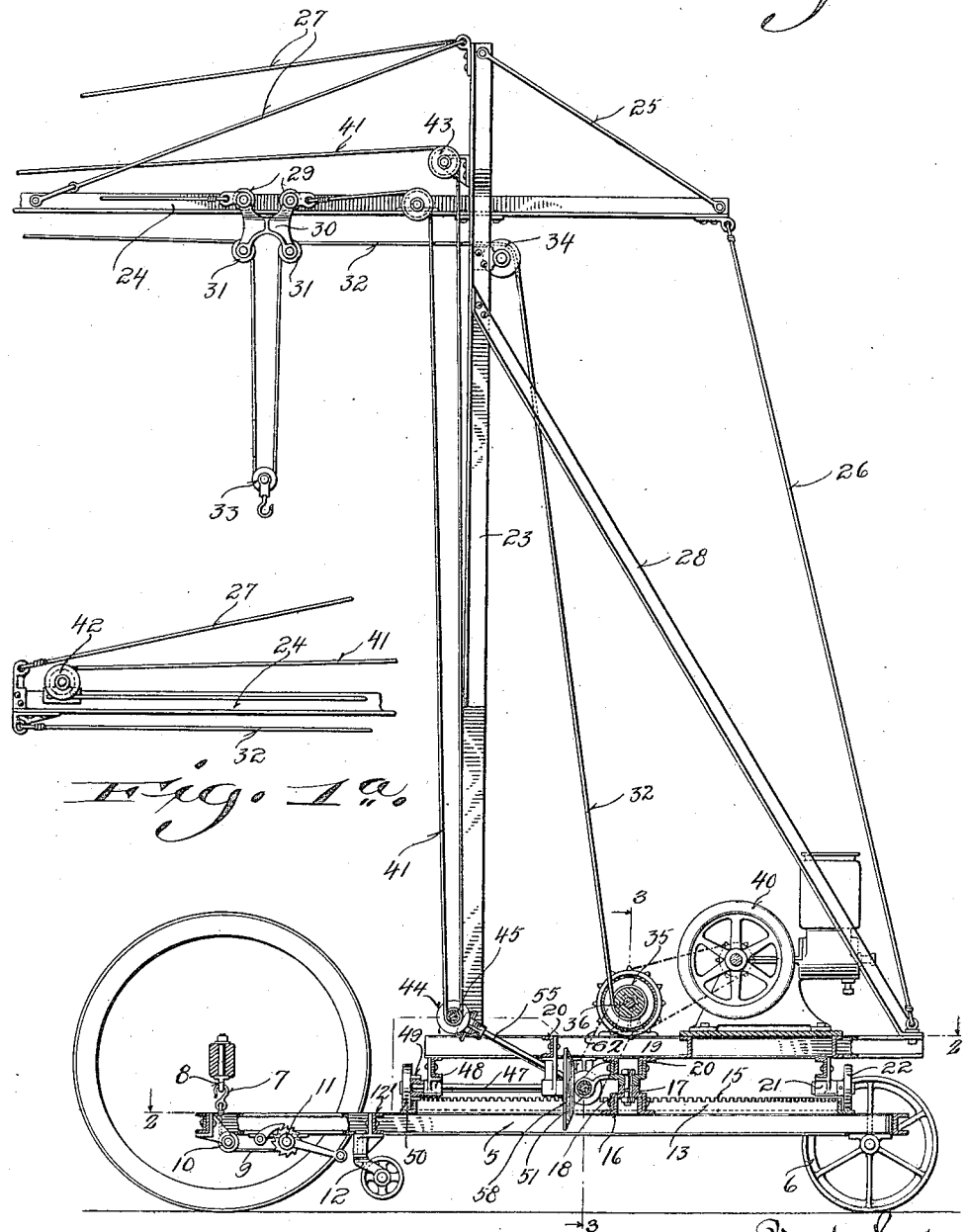

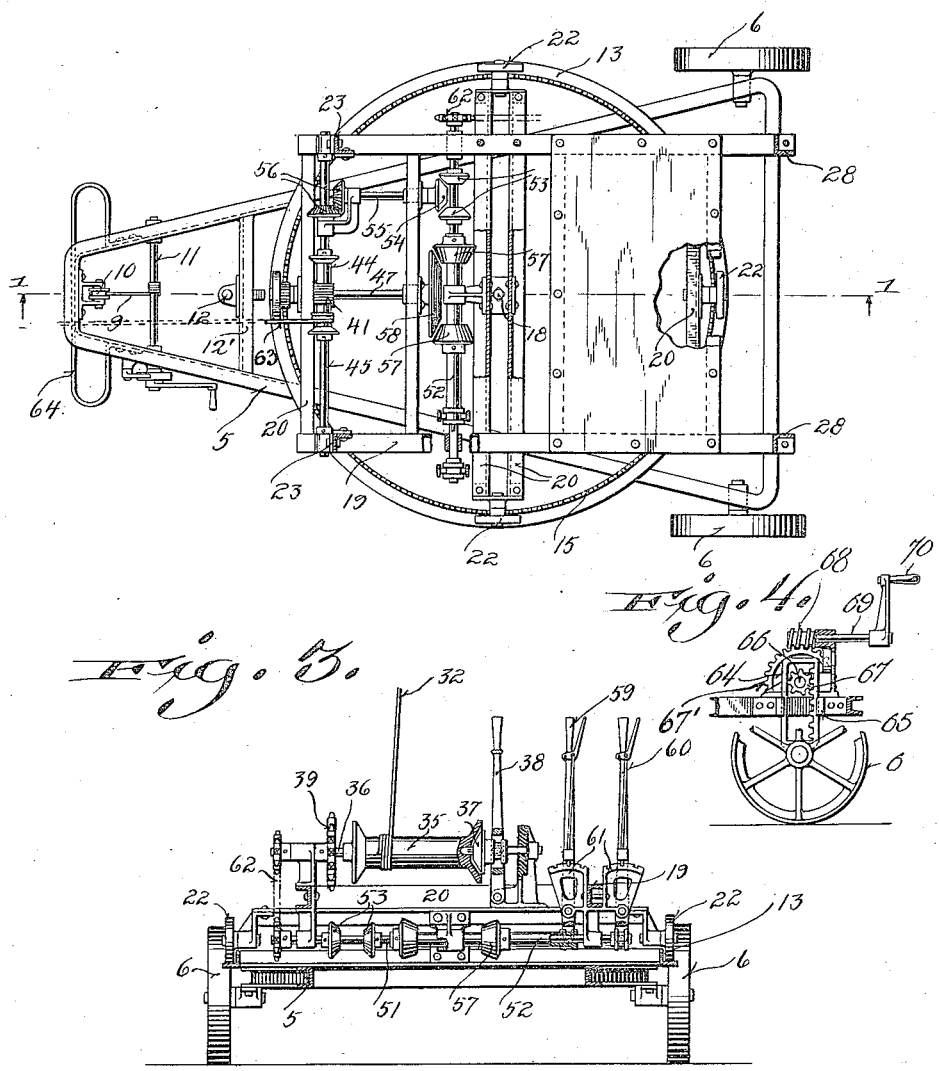

GARFIELD H. CALEY, OF WATERFORD, WISCONSIN, ASSIGNOR OF ONE-THIRD TO HERMAN J. HEMBROOK, OF WATERFORD, WISCONSIN.

CORN-SHOCK-LOADING MACHINE.

1,254,203.

Specification of Letters Patent.   Patented Jan. 22, 1918.

Application filed November 10, 1916.   Serial No. 130,531.

*To all whom it may concern:*

Be it known that I, GARFIELD H. CALEY, a citizen of the United States, and resident of Waterford, in the county of Racine and State of Wisconsin, have invented certain new and useful Improvements in Corn-Shock-Loading Machines; and I do hereby declare that the following is a full, clear, and exact description thereof.

The present invention relates to new and useful improvements in corn stack loading machines, more particularly of that type embodied in my co-pending application for patent filed March 30, 1915, Serial No. 18047 and comprising a turn table mounted on a portable base and carrying a mast having a boom on which is slidable a hoist rope carriage whereby stacks of corn may be lifted from the ground and conveyed to a wagon.

It is in general the object of the present invention to improve the efficiency and convenience of operation of such machines, and it is more particularly an object to provide a driving means for shifting the hoisting rope carriage and for rotating the turn table which is embodied in a compact structure with the drive means for the hoisting drum shown in my said previous application.

It is further an object to provide, in a loading machine embodying this construction, an arrangement whereby the machine may be used for filling and hoisting scrapers or other receptacles more particularly with a view to loading manure.

With the above and other objects and advantages in view the invention resides more particularly in the novel combination, arrangement and formation of parts more particularly hereinafter described and particularly pointed out in the appended claims.

In the drawings:

Figure 1 is a vertical sectional view through the corn stack loading machine constructed in accordance with the present invention, as indicated by the line 1—1 of Fig. 2.

Fig. 1ª is a view showing the forward extremity of the boom of the machine.

Fig. 2 is a horizontal sectional view through the base portion of the machine on the line 2—2 of Fig. 1.

Fig. 3 is a vertical sectional view taken through the machine transversely of the plane of Fig. 1, as indicated by the line 3—3 of Fig. 1.

Fig. 4 is a view showing a modified means for mounting one of the ground wheels of the machine in an adjustable manner to compensate for the irregularities on the ground on which the machine stands.

Referring now more particularly to the accompanying drawings, 5 designates the triangular turntable carrying frame of the machine, which is supported at its base end by the ground wheels 6 and which has its forward end adapted for suspension from the rear axle of a wagon vehicle by a hook 7 engageable in an eye 8 depending from the axle and carried by a cable 9 trained about a pulley 10 at the apex of the frame and extending rearwardly and wound about a windlass 11 carried by the frame, the forward end of the frame being supported when detached from the wagon by a swivelly depending wheeled leg 12 carried centrally by a transverse bar 12' at the forward portion of the frame.

Disposed on the frame is a circular track 13 which is of greater diameter than the distance between intermediate side sill portions of the frame and which is secured to the side sills at its points of intersection therewith whereby said sides and track are mutually braced. This track is formed of angle iron and its upstanding portion has a series of gear teeth 15 cut in its upper edge. A pair of beams 16 are carried by the frame diametrically of the track to support a central box 17 in which is mounted the pivot bolt of a turntable comprising a pair of side sills 19 and a plurality of cross sills 20, hanger arms 21 depending from the ends of the sills and carrying wheel 22 mounted on the track.

Upstanding at the forward end of the turntable is a mast comprising a pair of upwardly convergent angle iron sections 23 connected adjacent their upper ends and having secured thereto at their connection the rear portion of an angle iron boom 24, the rear end of the boom being extended past the mast for the securement of guy members 25 and 26 extending respectively to the upper extremity of the mast and to the rear portion of the frame whereby the boom is suitably braced, further brace means for the boom and mast comprising guy members 27 extending from the upper end of the mast to forward portions of the boom, and brace beams 28 extending from the mast sections diagonally to the rear corners of the turn table.

Mounted on a horizontal flange of the boom 24 are wheels 29 of a carriage 30 and carried by the carriage are a pair of pulleys 31 for a hoist rope 32 which has one end secured to the forward end of the boom and which is trained about said pulleys to form a loop carrying a snatch block 33, the hoist rope extending to the mast and about a pulley 34 thereof to a hoist rope drum 35 loosely mounted on a shaft 36 journaled transversely on the turntable drum, the drum having clutch engagement with the shaft by a clutch cone 37 splined on the shaft and engageable with the end of the drum and controlled by an upstanding lever 38 pivoted to the turntable frame.

The hoisting drum shaft 36 is driven by a sprocket connection 39 with an engine 40 of any desired type mounted on the turntable rearwardly thereof. For shifting the carriage longitudinally of the boom, a shifting rope 41 has one end secured to the carriage and extending forwardly and about a pulley 42 at the forward end of the boom, and thence rearwardly and about a pulley 43 on the mast, and thence downwardly and about a drum 44 on the transverse shaft 45 at the forward end of the turn table and thence upwardly and about a pulley 46 at the rear portion of the boom, and thence forward for securement of its other end to the carriage. Thus upon rotating the drum in different directions the carriage will be shifted back and forth upon the boom.

For rotating the turn-table, whereby in conjunction with the carriage shifting means, a stack of corn carried by the snatch block may be conveyed to any desired position for convenient disposal in a wagon or other receptacle, a horizontal shaft 47 is journaled in bearings 48 under the turn table frame and has fixed thereto at its outer portion a gear pinion 49 meshing with the gear teeth 15 of the turn table track. A wheel 50 is mounted on the outer extremity of the shaft and rides on the horizontal flange of the track 13. Inasmuch as in a machine of this particular nature, wherein relative movement of parts may occur due to the rough usage to which the machine is subjected, the wheel 50 performs the valuable function in retaining at all times the proper meshing engagement of the gear 49 and the teeth 15 of the track, particularly to prevent possible binding.

To provide a clutch control drive connection between the hoisting drum shaft 36 and the shafts 45 and 46, the shaft 51 is transversely journaled on the turn table below the frame thereof in a manner permitting longitudinal shifting movements, and splined on this shaft is a sleeve 52 which extends from the intermediate portion of the shaft to a point adjacent one end thereof. At the end of the sleeve, the shaft 51 carries a pair of oppositely disposed clutch cones 53 which are selectively engageable upon shifting the shaft by an intermediate clutch cone 54 carried by a shaft 55 which is geared to the shifting rope drum shaft 45 by intermeshing beveled gears 56. The sleeve carries a pair of oppositely disposed clutch cones 57 which are selectively engageable upon shifting the sleeve with an intermediate clutch cone 58 carried by the inner end of the turn table drive shaft 47.

Thus the shaft 51 and sleeve 52 are independently shiftable to selectively impart opposite rotative movements of the shafts 45 and 47 and to control the shifting movement of the shaft 51 and sleeve 52 a pair of upstanding levers 59 and 60 are carried by the turn table frame having yoke connection therewith, the positions of these levers being determined by suitable pawl racks 61 associated therewith. The shaft 51 at its end farthest from the levers has a sprocket connection 62 with the hoisting rope drive shaft 36, which permits the necessary shifting movement of the shaft 51 to procure its clutch actuation.

The entire operation of the machine for lifting and conveying corn stacks to a desired position is thus effected through the control of the levers 38, 59 and 60 which are disposed in juxtaposed position, to permit ready manipulation.

It may be desired to utilize the present machine for loading manure or other material by means of a receptacle preferably of the scraper type, and to adapt the machine for this use, a draft rope 63 attachable to the receptacle would be wound on the drum 45, and the snatch block 33 would be attached to the receptacle. Thus upon rotating the drum the receptacle would be drawn toward the machine to fill it, and the carriage 30 carrying the snatch block 33 would move inwardly in unison with the receptacle, so that upon the receptacle being filled it could be immediately hoisted and conveyed to a position for dumping.

Should the present machine during its use be disposed on uneven ground, the mast 23 would tilt considerably and interfere with a most efficient and economical operation of the machine, it is therefore in certain types of my machine, desirable to provide a means for adjusting the body frame 5 with respect to the ground, whereby a horizontal positioning of said body frame may be insured. In Fig. 4 I have illustrated one means for procuring this result by adjusting the ground wheels 6, and in this structure each of the ground wheels 6 is journally carried by the lower end of a loop 64, the sides of which are held by channel plates 65 on the corresponding side sills of the body frame whereby said loop is mounted for vertical sliding movement.

Transversely journaled on the sill is a shaft 66 projecting transversely within the loop and carrying a pinion 67 meshing with a series of rack teeth formed on one side of the loop. The shaft 66 also carries a gear wheel 67' meshing with a worm 68 carried on a transversely journaled operating shaft 69, this shaft being provided with a crank handle 70. Thus upon rotation of the crank handle the corresponding wheel 6 may be raised or lowered to procure a horizontal positioning of the body frame 5 of the machine irrespective of the inclination of the ground.

What is claimed:

1. A machine of the class described including a turntable, means for rotating the turntable including a shaft journally carried thereby, a boom carried by the turntable, a carriage movable on the boom, a hoisting rope carried by the carriage, a main drive shaft, a clutch controlled hoisting rope drum mounted on the main drive shaft, a shifting rope connected with the carriage, a drum for the shifting rope, an intermediate shaft, clutch connections between said intermediate shaft and the shifting rope drum and first named shaft, and a drive connection between the main drive shaft and said intermediate shaft.

2. A machine of the class described including a turntable, a trio of shafts disposed parallel to each other and journally carried by said turntable, a clutch controlled hoisting rope drum mounted on one of said shafts, a clutch controlled shifting rope drum disposed on another of said shafts, a clutch controlled driving connection between the other of said shafts and the shifting rope shaft, a geared connection between the last mentioned shaft and the hoisting rope shaft, means for rotating the hoisting rope shaft, whereby to actuate said other shafts, a boom carried by the turntable, a carriage movable on the boom, a hoisting rope carried by the carriage and connected with said hoisting rope drum, a shifting rope connected with the carriage and the shifting rope drum, and means operable by one of said shafts for rotating said turntable.

In testimony that I claim the foregoing I have hereunto set my hand at Milwaukee, in the county of Milwaukee and State of Wisconsin, in the presence of two witnesses.

GARFIELD H. CALEY.

Witnesses:
   FRANK L. RATCLIFFE,
   M. E. DOWNEY.

Copies of this patent may be obtained for five cents each, by addressing the "Commissioner of Patents, Washington, D. C."